United States Patent [19]
Abo et al.

[11] Patent Number: 5,194,774
[45] Date of Patent: Mar. 16, 1993

[54] ELECTRIC-POWERED TOOL

[75] Inventors: Kimitaka Abo, Mito; Junichi Kikuchi; Yoshio Osada, both of Katsuta, all of Japan

[73] Assignee: Hitachi Koki Company Limited, Tokyo, Japan

[21] Appl. No.: 720,665

[22] Filed: Jun. 25, 1991

[30] Foreign Application Priority Data

Jun. 29, 1990 [JP] Japan .................. 2-70057[U]

[51] Int. Cl.$^5$ ........................... H02K 13/00
[52] U.S. Cl. ................... 310/239; 310/68 R; 310/71; 310/91; 310/180; 310/207
[58] Field of Search ............... 310/71, 238, 239, 241, 310/242, 245, 247, 50, 51, 68 R, 207, 254, 180, 261, 179, 184, 208, 91

[56] References Cited

U.S. PATENT DOCUMENTS

| | | | |
|---|---|---|---|
| 670,119 | 3/1901 | Trier | 310/242 |
| 3,942,056 | 3/1976 | Gehring, Jr. | 310/239 |
| 4,090,098 | 5/1978 | Kranzler | 310/71 |
| 4,370,579 | 1/1983 | Kobayashi | 310/71 |
| 4,613,781 | 9/1986 | Sanders | 310/50 |
| 4,851,730 | 7/1989 | Fushiya | 310/71 |
| 4,963,779 | 10/1990 | Lentino | 310/71 |
| 4,978,877 | 12/1990 | Quirijnen | 310/239 |

FOREIGN PATENT DOCUMENTS 2804681  8/1979  Fed. Rep. of Germany ...... 310/239

OTHER PUBLICATIONS

McGraw-Hill Encyclopedia of Science and Technology, 3rd Edition; No Publication Date; 2 pages; (Exhibit "A").
McGraw-Hill Dictionary of Scientific and Technical Terms by D. N. Lapedes, (No Month) 1974; New York, St. Louis, San Francisco.

*Primary Examiner*—R. Skudy
*Attorney, Agent, or Firm*—Pollock, VandeSande & Priddy

[57] ABSTRACT

An electric-powered tool comprises: a housing; and a brush motor contained in the housing, having: brush holders, each of brush holders holding a carbon brush; and brush terminals, made of an electrical conductive and elastic material having at least one blade portion, a palm portion, and an arm portion, for providing electrical connection thereof to the brushes through the brush holder by catching and griping the brush holder by the blade and the palm portions, the arm portion extending from the palm portion to an end where a fixing portion is provided, each of the brush terminals being fixed by the fixing portion with a positional offset to develop a contact pressure between the palm portion and the brush holder. Further, the arm portion is further extending over the fixing portion to form a connecting portion. On the other hand, one end of a field coil is connected to a connector. Thus, the brush holder is connected to the field coil through the connection portion and the connector.

3 Claims, 4 Drawing Sheets

ELECTRIC-POWERED TOOL

BACKGROUND OF THE INVENTION

1. Field of the Invention

This invention relates to an electric-powered tool.

2. Description of the Prior Art

A prior art electric-powered tool is known, which comprises a housing and a brush motor having brush terminals, each of brush terminals comprising a coil spring wound around a brush holder supporting a brush, for providing electrical connection between the brush holder and an end of a field coil. FIG. 7 is a plane view of such a prior art brush terminal. A brush terminal comprising a coil spring 211 provides an electrical connection between a lead wire 212 and a cylindrical brush holder 210. Connecting the brush terminal to the brush holder 210 is carried out using a hole into which a carbon brush is inserted or a narrow space inside a stator assembled in the housing because there is no space for access by a hand or a fixing tool to the fixing area. Thus, work efficiency is low and skillfulness is required. This obstructs reduction of an assembling interval or automatic assembling.

FIG. 8 is a plane view of another prior art brush terminal. A brush terminal 111 made of a conductive elastic body is provided to improve the assembling interval as shown in FIG. 8. The brush terminal 111 contacts the brush holder 110 at three points "a", "b", and "c". However, the number of contacting points of this brush terminal 111 is fewer than that of the brush terminal 211 comprising the coil spring of the prior art, so that there is a problem that a stable conducting condition cannot be maintained. In other words, vibration of electric-powered tools causes production of an arc by momentary disconnection or minute rotation of the brush holder.

SUMMARY OF THE INVENTION

The present invention has been developed in order to remove the above-described drawbacks inherent to the conventional electric-powered tool.

According to the present invention there is provided an electric-powered tool comprising: a housing; and a brush motor contained in the housing, having: brush holders (one brush holder is shown in FIGS. 1 and 5), each of brush holders holding a carbon brush; and brush terminals, made of an electrical conductive and elastic material having at least one blade portion, a palm portion, and an arm portion, for providing an electrical connection thereof to the brushes through the brush terminal by catching and griping the brush holder by the blade and the palm portions, the arm portion extending from the palm portion to an end where a fixing portion is provided, each of the brush terminals being fixed by the fixing portion with a positional offset to develop a contact pressure between the palm portion and the brush holder. Further, the arm portion is further extending over the fixing portion to form a connecting portion. On the other hand, one end of a field coil is connected to a connector. Thus, the brush holder is connected to the field coil through the connection portion and the connector.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Hereinbelow will be described an embodiment of this invention.

Figure 1:
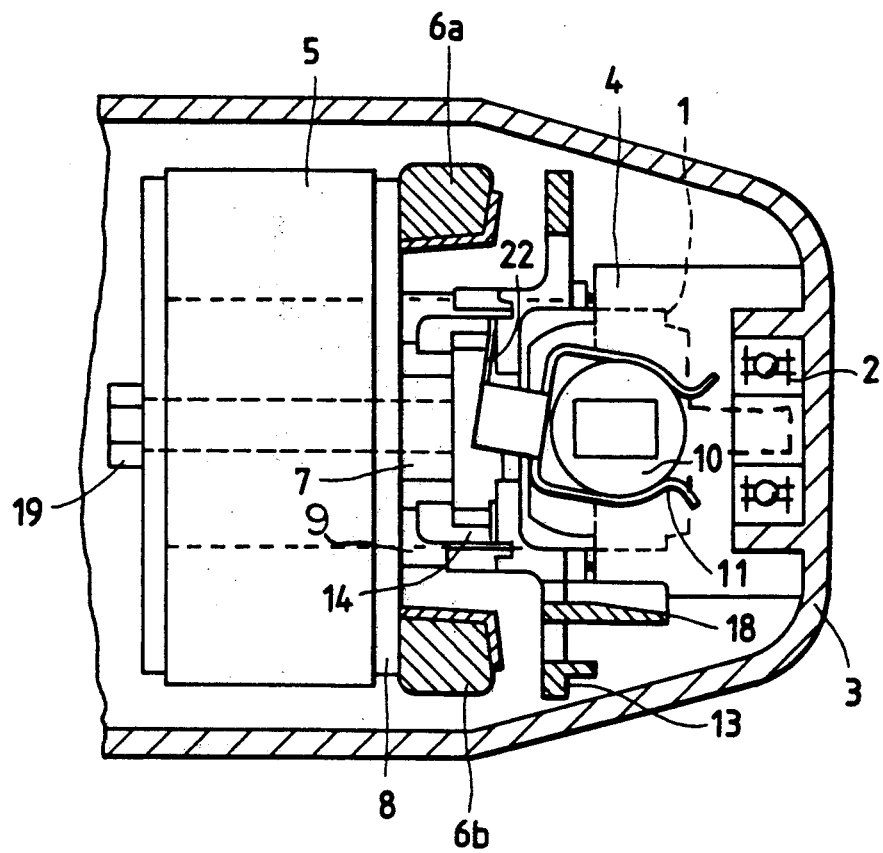
FIG. 1 is a cross-sectional view of the embodiment of the invention of an electric-powered tool partially shown.
Figure 6:
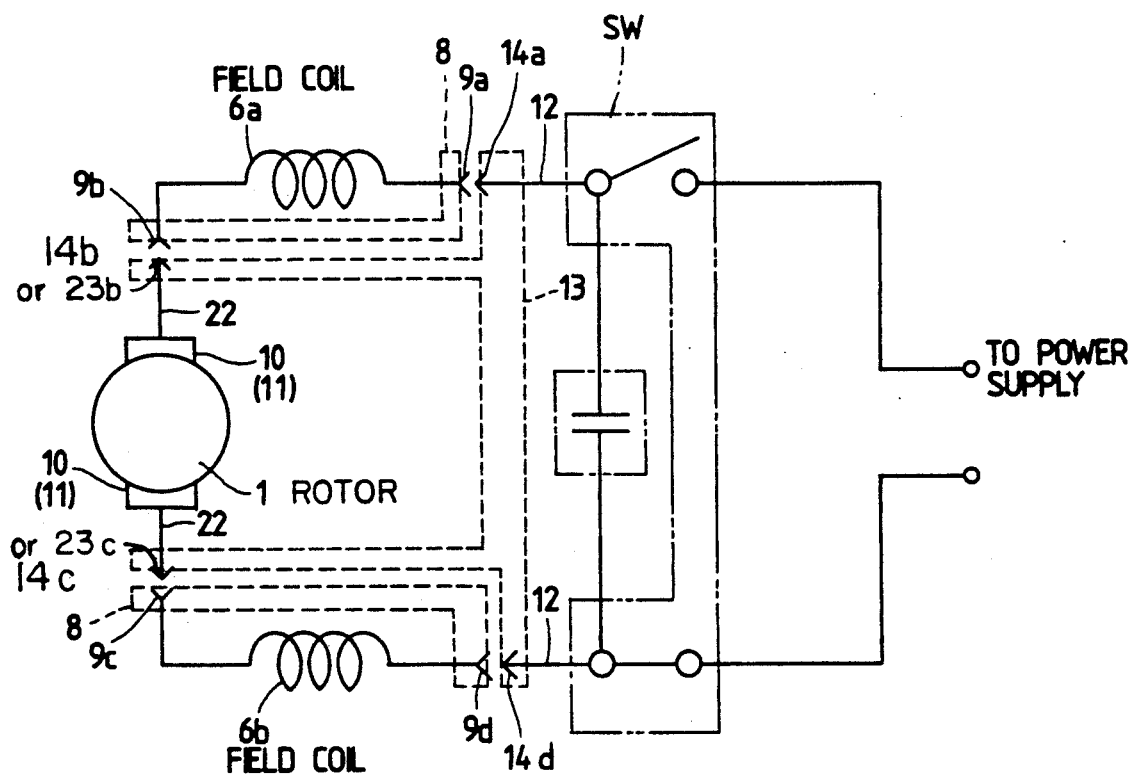
FIG. 6 is an interconnection diagram of the electric-powered tool.
Figure 7:
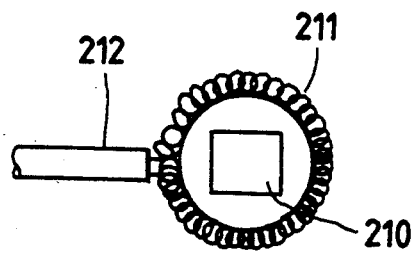
FIG. 7 is a plane view of a prior art brush terminal.
Figure 8:
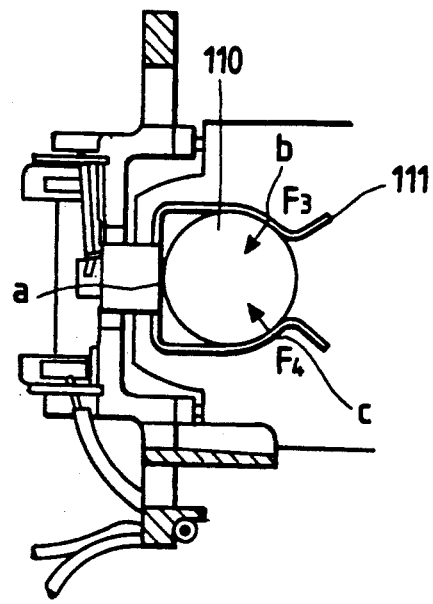
FIG. 8 is a plane view of another prior art brush terminal.

FIG. 1 is a cross-sectional view of the embodiment of the invention of an electric-powered tool partially shown. FIG. 6 is an interconnection diagram of the electric-powered tool. In FIGS. 1 and 6, a rotor 1 is supported by a housing 3 through bearings 2 at its both ends. A stator 5 is arranged coaxially with respect to rotation of the rotor 1 and fixed to the housing 3. Field coils 6a and 6b are provided to the stator 5. One end of a field coil 6a is connected to a female terminal 9a; another end, to a female terminal 9b. Similarly, one end of a field coil 6b is connected to a terminal 9c; another end, to a female terminal 9d. The first terminal block 8 supports the female terminals 9a-9d. The first terminal block 8 is formed of an insulating material and is fixed to the stator 5. A second terminal block 13 formed of an insulating material confronts the terminal block 8 and is fixed to the first terminal block 8 by respectively fitting the female terminals 9 (9a-9d) to a terminal 14a, terminal portions 23b and 23c, and a terminal portion 14d provided to the second terminal block 13. The brush terminal 11 is electrically connected to the brush holder 10 by catching and griping the brush holder 10.

First terminal block 8 supporting connecting portions and second connecting block 13 supporting second connecting portions and receiving before-mentioned connecting portions.

Figure 2A:
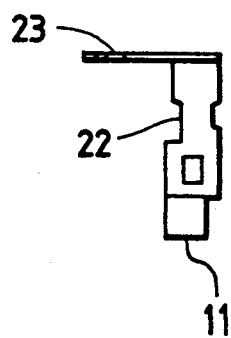
FIG. 2A is a side view of the brush terminal 11.
Figure 2B:
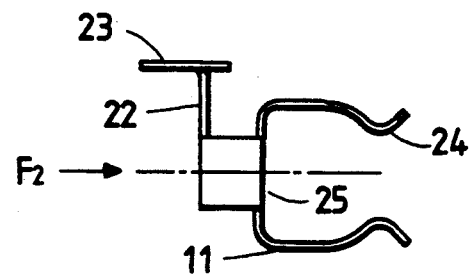
FIG. 2B is a front view of the brush terminal 11.
Figure 3:
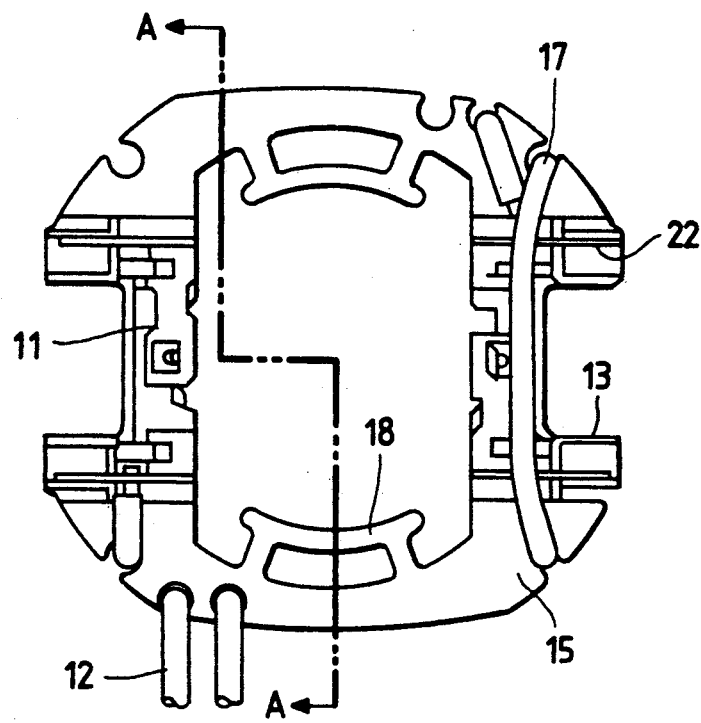
FIG. 3 is a plane view of the terminal block 13.
Figure 4:
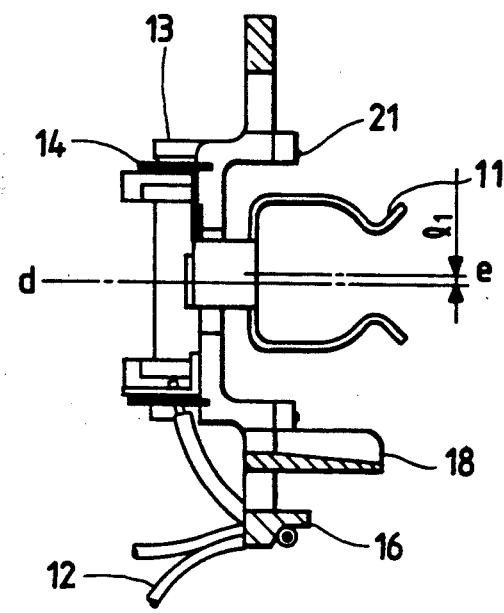
FIG. 4 is a cross-sectional view of the terminal block 13 taken on line A—A in FIG. 3.

FIG. 2A is a side view of the brush terminal 11. FIG. 2B is a front view of the brush terminal 11. FIG. 3 is a plane view of the terminal block 13. FIG. 4 is a cross-sectional view of the terminal block 13 taken on line A—A in FIG. 3.

The brush terminal 11 is made of an electrically conductive material and has the male terminal portion 23 to be fitted to a female terminal 9 and an arm portion 22 subjected to an elastic deformation at assembling. In other words, terminals 14a, 14b, 14c, and 14d, and female terminals 9a, 9b, 9c, and 9d form a series circuit including the field coil 6a and 6b, brush terminals 11, brush holders 10, the brushes, and rotor 1 as shown in FIG. 6. The brush terminal 11 has an incline portion (blade) 24 so as to catch and grip the brush holder 10 including a brush 100 (FIG. 5) with an elastic deformation of the brush terminal 11 whose gap has a smaller width than the diameter of the brush holder 10.

The terminal block 13 has male terminals 14 (including the male terminal portions 23 of the brush terminals 11) whose number is the same as that of the female terminals 9 (9a-9d) connected to both ends of the field coil 6a or 6b and is formed so as to be integral with an arm portion 15 having a rib 16 for fixing a lead wire 12 and a rib 18 for guiding a cooling air. The brush terminal 11 is fixed to the arm portion 15. A switch SW or the lead wire 12 is connected to one end of the male terminal 14 and is supported by the arm portion 15 using rib 16 and a slot 17 for fixing a lead wire.

FIG. 4 shows the brush terminal 11 of an initial condition. An offset $l_1$ is provided between a rotational axis "d" of the rotor 1 and a center line "e" of the brush terminal 11.

Figure 5:
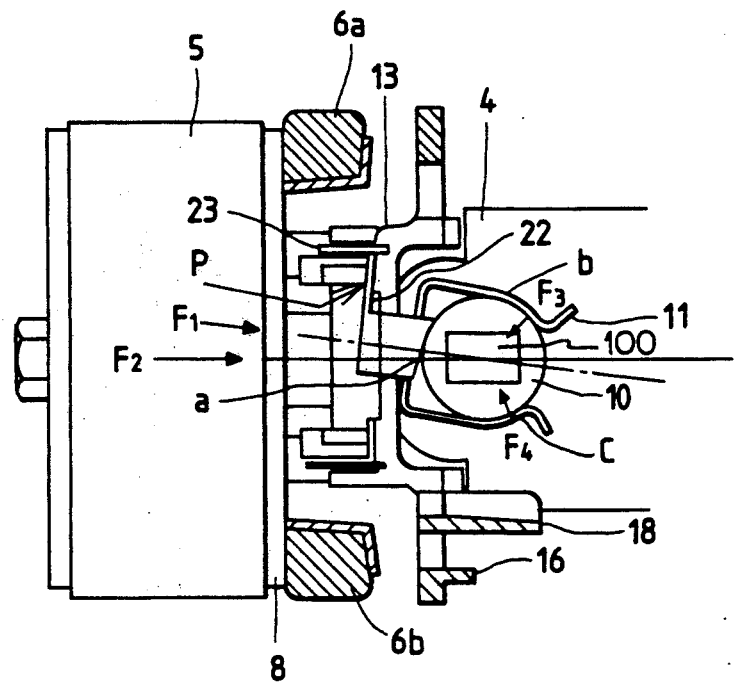
FIG. 5 shows a shape of the brush terminal 11 when it is assembled.

FIG. 5 shows a shape of the brush terminal 11 when it is assembled.

The brush terminal 11 fitted to the brush holder 10 by an assembling force $F_2$, as it is elastically deformed, is mounted thereto with a slight deformation left.

The brush terminal 11 is fitted to and electrically connected to the brush holder 10 by a restoring force $F_3$ developed by the above-mentioned slight deformation.

Moreover, when the brush terminal 11 is set on a given place, a contact pressure to the contacting point "a" of a palm portion 25 of the brush terminal by the restoring force is developed by the connecting or arm portion 22 elastically deformed around a supporting point P because the arm portion 22 is fixed to the terminal block 13 with a positional offset. Thus, the contact pressure of the brush terminal 11 to the brush holder 10 is further increased.

The offset $l_1$ shown in FIG. 4 is so determined that the restoring force $F_3$ is approximately the same as the restoring force $F_4$ in the assembled condition shown in FIG. 5.

In the above-mentioned structure, the terminal block 13 is mounted to the terminal block 8 fixed to the stator 5 by connection between female and male terminals 9 and 14 or male terminal portions 23. Then, the stator 5 is assembled into the housing 3. This provides connection of the brush terminal 11 to the brush holder 10 automatiacally and completes the interconnection at the same time.

This invention prevents electrically poor contact due to vibrations because the contact pressure is increased by fixing the brush terminal 11 with positional offset, so that the pressure force exist constantly to the brush holder.

What is claimed is:

1. An electric-powered tool comprising:
   (a) a housing; and
   (b) a brush motor contained in said housing, having:
      (I) brush holders, each of the brush holders holding a corresponding one of brushes; and
      (II) brush terminals, each of the brush terminals being made of an electrical conductive and elastic material having at least one blade portion, a palm portion, and an arm portion, for providing electrical connection to the corresponding one of said brushes by catching and gripping one of said brush holders by said blade and said palm portions, said arm portion extending from said palm portion to an end where a supporting portion is provided, each of said brush terminals being supported by said supporting portion with a positional offset to develop a contact pressure between said palm portion and one said brush holders.

2. An electric-powered tool as claimed in claim 1, wherein said arm portion is further extending over said supporting portion to form a connecting portion for connecting said one of brushes to an end of a field coil of a stator of said brush motor.

3. An electric-powered tool as claimed in claim 2, further comprising:
   (a) a first terminal block supporting said connecting portions;
   (b) a second terminal block supporting second connecting portions receiving said connecting portions respectively; and
   (c) pairs of connectors for receiving a supply voltage and supplying it to a series circuit including said field coil of said stator, a rotor of said motor, one of each of said pairs of said connectors being provided to said first terminal block, another one of each of said pairs of said connectors being provided to said second terminal block, said connecting portions being connected to said second connecting portions and said pairs of connectors being connected by fitting said first terminal block to said second terminal block.

* * * * *